United States Patent [19]

Liu

[11] Patent Number: 4,618,644
[45] Date of Patent: * Oct. 21, 1986

[54] NOVEL SILICONE-CONTAINING INTERPENETRATING POLYMER NETWORKS

[75] Inventor: Wan-Li Liu, Ballston Lake, N.Y.

[73] Assignee: General Electric Company, Waterford, N.Y.

[*] Notice: The portion of the term of this patent subsequent to Apr. 29, 2003 has been disclaimed.

[21] Appl. No.: 724,361

[22] Filed: Apr. 16, 1985

[51] Int. Cl.$^4$ .................. C08F 283/12; C08L 83/10
[52] U.S. Cl. .................. 524/535; 524/500; 525/479; 528/32
[58] Field of Search .................. 525/479; 524/539, 500

[56] References Cited

U.S. PATENT DOCUMENTS

| 2,956,044 | 10/1960 | Merker | 525/479 |
| 2,965,593 | 12/1920 | Dietz | 525/479 |
| 3,565,851 | 2/1971 | Neuroth | 525/479 |
| 3,879,491 | 4/1975 | Lindsey et al. | 525/479 |
| 4,201,808 | 5/1980 | Cully et al. | 525/479 |
| 4,322,517 | 3/1982 | Deubzer et al. | 525/479 |
| 4,486,577 | 12/1984 | Mueller et al. | 525/479 |

FOREIGN PATENT DOCUMENTS 45-32631  10/1970  Japan .................. 525/479

Primary Examiner—Wilbert J. Briggs, Sr.
Attorney, Agent, or Firm—Gary L. Loser

[57] ABSTRACT

There is provided a curable composition comprising at least one silicone resin dispersed in at least one olefinic organic monomer.

12 Claims, No Drawings

NOVEL SILICONE-CONTAINING INTERPENETRATING POLYMER NETWORKS

BACKGROUND OF THE INVENTION

The present invention relates to interpenetraring polymer networks formed from an acrylic-containing polysiloxane and an olefinic organic monomer. More particularly, the present invention relates to resinous silicone block copolymers reinforced by in situ polymerization of an olefinic organic monomer such as styrene.

Interpenetrating polymer networks (IPN's) are a unique type of polyblend synthesized by swelling a polymer with a monomer and activating agents, and polymerizing the monomer in situ. If one polymer is elastomeric and one polymer plastic at use temperature, the combination tends to behave synergistically, and either reinforced rubber or impact resistant plastic results, depending upon which phase predominates. See, for example, *Polymer Blends and Composites*, J. A. Manson and L. H. Sperling, pages 237-270, Plenum Press (1976).

Dietz, U.S. Pat. No. 2,965,593, discloses intimate homogeneous mixtures prepared by dispersing a polydiorganosiloxane substantially free of polymerizable olefinic groups in a vinyl monomer.

Bluestein, U.S. Pat. No. 4,014,851, discloses a polymer-filled vinylorganopolysiloxane dispersion comprising a continuous phase of an essentially ungrafted vinylorganopolysiloxane fluid having dispersed therein a discontinuous phase comprising finely divided solid particles of an ungrafted polymer prepared from an organic monomer having aliphatic unsaturation or a mixture of such monomers polymerized in the presence of said vinylorganopolysiloxane.

The present invention is based on the discovery that improved silicone resins can be prepared by forming an interpenetrating polymer network of said resin and an olefinic monomer. That improved resins could be obtained in such a manner was quite unexpected in view of the fact that both silicone resins and thermoplastics formed from vinyl monomers are generally quite brittle.

SUMMARY OF THE INVENTION

It is an object of the present invention to provide an interpenetrating polymer network prepared from a silicone resin and an olefinic organic monomer.

It is another object of the present invention to provide interpenetrating polymer networks which exhibit abrasion resistance, toughness, flexibility, dirt repellency and solvent resistance.

In accordance with the present invention there are provided curable compositions, comprising:

(a) at least one silicone resin dispersed in (b) at least one olefinic organic monomer.

Those skilled in the art will appreciate that the term "dispersed in" is used for convenience inasmuch as there can be present more silicone resin than olefinic organic monomer.

DESCRIPTION OF THE INVENTION

There is provided by the present invention curable compositions comprising (a) a silicone resin, (b) an olefinic organic monomer and, preferably (c) an effective amount of cure promoter.

Silicone resins suitable for practicing the present invention are known in the art and can readily be ascertained by the artisan without undue experimentation.

The most preferred silicone resins for practicing the present invention are described in my copending patent application, Ser. No. 688,489, filed Jan. 3, 1985, now U.S. Pat. No. 4,585,670, assigned to the same assignee as the present invention. Briefly, application Ser. No. 688,489 discloses a silicone block copolymer composition comprising:

(a) at least one block consisting essentially of from about 6 to about 120 units of the formula

(b) at least one block consisting essentially of from about 3 to about 160 units of the formula

(c) at least one block consisting essentially of from about 0.1 to about 20 mole percent of (a) and (b) of units of the formula

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula

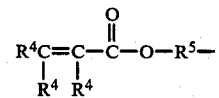

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms.

Such resinous block copolymers can be prepared by a variety of methods known in the art. In a particularly preferred method, 100 parts by weight of a silanol terminated polydiorganosiloxane having repeating units varying from 6 to 120 is placed in a reaction vessel containing from about 100 to about 500 parts by weight of an organic solvent such as toluene and from about 500 to about 2500 parts by weight water. Sufficient agitation is applied to form a dispersion. An amount of phenyltrichlorosilane, methyltrichlorosilane and acrylic-functional dichlorosilane are added to the reaction vessel containing the dispersion while providing sufficient agitation to maintain the dispersion. The dispersion is stirred at from about 25° C. to about 50° C. for anywhere from 15 minutes to 10 hours or more to effect reaction. The resultant aqueous phase contains reaction by-products such as hydrogen chloride while the organic phase contains the acrylic-functional silicone resin.

The advantage of employing such a resin to practice the present invention is that both the resin and the olefinic organic monomer will crosslink upon exposure to either ultraviolet radiation or heat to form an interpenetrating polymer network. The aforesaid U.S. patent application Ser. No. 688,489, filed Jan. 3, 1985, is incorporated by reference into the instant disclosure.

If it is critical that there be essentially no crosslinking between the silicone resin and the olefinic organic monomer, it is possible to utilize a silicone resin which cures by a condensation reaction. Such silicone resins are well known in the art, for example, as described in U.S. Pat. Nos. 2,521,672 to Berhenke et al., 2,587,295 to Doyle et al., 3,389,114 to Burzynski et al. 3,642,693 to Jasinski, 3,759,867 to Merrill, 3,846,358 to Roedel and 4,160,858 to Roedel, all of which are incorporated by reference into the present disclosure. Other suitable silicone resins will be obvious to those of ordinary skill in the art.

The amount of silicone resin employed in the practice of the present invention is not critical. Generally, the best results are obtained when the silicone resin is present in an amount ranging from about 30% by weight to about 95% by weight of the total composition. An especially preferred embodiment utilizes from about 50% by weight to about 80% by weight of silicone resin based on the total composition. Of course, a mixture of silicon resins can be employed in the practice of my invention.

The second essential component for practicing the present invention is an olefinic organic monomer. The olefinic organic monomer can be monofunctional or polyfunctional but preferably is monofunctional. Examples of suitable olefinic organic monomers are styrene, α-methylstyrene, 2-vinylpyridine, 4-vinylpyridine, 1-vinylimidazole, 2-vinylnaphthylene, 5-vinyl-2-norborene, 4-vinyl-1-cyclohexene, vinyl crotonate, divinylbenzene, N-vinyl-2-pyrrolidinone and vinylbenzyl chloride. Most preferably the olefinic organic monomer is styrene, α-methylstyrene or divinylbenzene.

The artisan will recognize that the foregoing examples are all vinyl-containing monomers since they will be most reactive. However, the use of allyl, acrylic and other such functional groups are all within the intended scope of the appended claims.

The amount of olefinic organic monomer or mixture of monomers can also vary and is generally within the range of from about 5% by weight to about 70% by weight of the total composition. Preferably the amount of olefinic organic monomer is present in an amount of from about 30% by weight to about 50% by weight of the total composition.

In order to obtain commercially acceptable cure rates it is desirable to include one or more cure promoters in the composition. When curing is effected by a free radical mechanism, an effective amount of a cure promoter such as t-butylperbenzoate, amino, nitro and phenol compounds such as p-hydrodiphenyl p-nitroaniline, 2,6-dichloro-4-nitroaniline, keto compounds such as acetophenone and Michler's ketone, aldehydes such as benzaldehyde, quinones such as benzoquinone and anthroquinone, or anthrone compounds such as 3-methyl-1,3-diazo-1,9-benzanthrone may be used. Other photoinitiators suitable for use in UV curable interpenetrating polymer networks can be ascertained by the artisan without undue experimentation. If a condensation curable resin is utilized, it may be advantageous to further include a well known condensation cure catalyst such as a metal salt of a monocarboxylic acid or a dicarboxylic acid, for example, dibutyltindilaurate or the like. Generally, an effective amount of cure promoter is from about 0.1% by weight to 10% by weight of the total composition.

Those skilled in the art will recognize that free-radical curing can also be effected by exposing the composition to elevated temperatures, for example, 100° C. or more, or at room temperature using, for example, Fenton's reagent.

The interpenetrating polymer networks of the present invention are prepared by dispersing the silicone resin in the olefinic organic monomer and thereafter polymerizing the olefinic monomer in situ and curing the silicone resin.

The compositions of the present invention can include other additives known in the art. It is especially preferred that glass fibers be included as a filler.

In order to better enable the artisan to practice the present invention the following examples are provided by way of illustration and not by way of limitation. All parts are by weight unless otherwise stated.

EXAMPLES

Example 1

Fifty grams of silanol-terminated polydimethylsiloxane with 30 repeating units, on average, per molecule, 120 grams toluene and 500 grams water were placed in a reaction vessel. Sufficient agitation was applied to form a dispersion. In a pre-dried vessel, 90 grams of phenyltrichlorosilane, 6.4 grams of methyltrichlorosilane and 8.87 grams of methacryloxypropylmethyldichlorosilane and 120 grams of toluene were admixed and thereafter added to the reaction vessel. Agitation was applied for 30 minutes during which time the temperature increased from about 25° C. to about 50° C. The aqueous phase was separated from the organic phase and the organic phase then was washed twice with water. The organic phase was azeotroped to remove residual HCl and water and to obtain a solids content of 60-70%. The resinous silicone block copolymer was then precipitated in water and chopped into a powder with a blender. After filtration the polymer powder was dried under vacuum to remove residual water.

Example 2

The resinous block copolymer prepared in Example 1 was dissolved in styrene in a weight ratio of 2:1. Approximately 1% by weight of diethylacetophenone (DEAP) photoinitiator, based on the total weight, was mixed with the polymer/monomer solution. The thus prepared curable composition was applied to glass, plastic and metal substrates which coated substrates were irradiated under the following conditions:
 20 ft/min
 420 watts and 7 amps
 nitrogen atmosphere.
There resulted a coating material which exhibited excellent abrasion resistance, toughness, flexibility, adhesion, dirt repellency and solvent resistance.

Example 3

In this example, silicone resins were prepared in accordance with Example 1 with the amount of acrylic-functional groups ranging from 1% to 5% by weight. 100 parts by weight of the resin was then dispersed in 25 parts by weight styrene containing 5 parts DEAP photoinitiator. This mixture was then applied in a five mil thick film to aluminum and steel substrates and cured by exposing the coated substrates to a UV light source for 1.5 sec. (i.e. 20 ft/min. line speed). The results are set forth in Table I.

TABLE I

| Ex | % methacryl groups in resin | Parts resin | Parts styrene | Parts DEAP | Result[1] |
|---|---|---|---|---|---|
| 3a | 5 | 100 | 25 | 5 | cured |
| 3b | 4 | 100 | 25 | 5 | cured |
| 3c | 3 | 100 | 25 | 5 | cured |
| 3d | 2 | 100 | 25 | 5 | cured |
| 3e | 1 | 100 | 25 | 5 | cured |

[1] None of the cured films dissolved in toluene, chloroform, hexane or xylene.

Example 4

In this example the silicone resin contained two weight percent methacryl groups, however, the olefinic organic monomer and photoinitiator were varied. Film thickness and cure conditions were the same as in Example 3. Results are provided in Table II.

TABLE II

| Ex. | Parts resin | Parts Monomer (A) | Parts Monomer (B) | Photoinitiator (C) | Photoinitiator (D) | Results |
|---|---|---|---|---|---|---|
| 4a | 100 | 50 | — | — | 1 | cured |
| 4b | 100 | 50 | — | 1 | — | cured |
| 4c | 100 | 50 | — | 0.5 | 0.5 | cured |
| 4d | 100 | — | 50 | — | 1 | cured |
| 4e | 100 | — | 50 | 1 | — | cured |
| 4f | 100 | — | 50 | 0.5 | 0.5 | cured |
| 4g | 100 | 25 | 25 | 0.5 | 0.5 | cured |

[1] None of the cured films dissolved in toluene or hexane.
(A) α-methylstyrene
(B) divinylbenzene
(C) diethylacetophenone
(D) t-butylperbenzoate

Example 5

The same resin as employed in Example 4 was employed in this example, however, various combinations of olefinic organic monomers were tested. Film thickness and cure conditions were the same as in Example 3. Results are provided in Table III.

TABLE III

| Ex. | Parts resin | Monomer I | Monomer II | Parts DEAP | Results[1] |
|---|---|---|---|---|---|
| 5a | 100 | Styrene (25 parts) | Hydroxyethyl methacrylate (25 parts) | 1.5 | cured |
| 5b | 100 | Styrene (50 parts) | Hydroxyethyl acrylate (50 parts) | 2 | cured |
| 5c | 100 | Styrene (50 parts) | Methylmethacrylate (50 parts) | 2 | cured |
| 5d | 100 | Styrene (50 parts) | n-Hexyl-methacrylate (50 parts) | 2 | cured |
| 5e | 100 | Styrene (50 parts) | Methacrylic acid (50 parts) | 2 | cured |
| 5f | 100 | Styrene (50 parts) | Acrylonitrile (50 parts) | 2 | cured |
| 5g | 100 | Styrene (50 parts) | Vinyl acetate (50 parts) | 2 | cured |
| 5h | 100 | Divinyl benzene (50 parts) | Hydroxyethyl Methacrylate (50 parts) | 2 | cured |
| 5i | 100 | Divinyl benzene (50 parts) | Trimethylolpropane triacrylate (25 parts) | 1.75 | cured |
| 5j | 100 | Divinyl benzene (50 parts) | Pentaerythritol triacrylate (25 parts) | 1.75 | cured |
| 5k | 100 | α-methyl-styrene (50 parts) | 1,6-Hexanediol diacrylate (25 parts) | 1.75 | cured |
| 5l | 100 | α-methyl-styrene (50 parts) | Trypropylene glycol diacrylate (25 parts) | 1.75 | cured |

[1] None of the cured films dissolved in toluene, chloroform, xylene or hexane.

All of the foregoing examples also exhibited excellent abrasion resistance, toughness and the like so as to make them suitable for use as a protective coating.

I claim:

1. A curable composition comprising:
   (I) a silicone resin comprising:
   (a) at least one block consisting essentially of from about 6 to about 120 units of the formula $R^2SiO$ (b) at least one block consisting essentially of from about 3 to about 160 units of the formula $R^1SiO_{1.5}$, and
   (c) at least one block consisting essentially of from about 0.1 to about 20 mole percent of (a) and (b) of units of the formula $RR^3SiO$;

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula

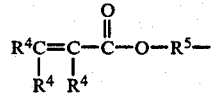

where the $R^4$ radicals are the same or different and represent hydrogen parts or monovalent substituted or unsubstituted hydrocarbon radicals having from 1 to 12 carbon atoms and $R^5$ is a divalent substituted or unsubstituted hydrocarbon radical having from 2 to 12 carbon atoms, said resin being dispersed in
   (II) at least one olefinic monomer.

2. The composition of claim 1, wherein the silicone resin is present in an amount ranging from about 30% by weight to about 95% by weight of the total composition.

3. The composition of claim 1, wherein the silicone resin is present in an amount ranging from about 50% by weight to about 80% by weight of the total composition.

4. The composition of claim 1, wherein the olefinic organic monomer is selected from the group consisting of styrene, α-methylstyrene, 2-vinylpyridine, 4-vinylpyridine, 1-vinylimidazole, 2-vinylnaphthylene, 5-vinyl-2-norborene, 4-vinyl-1-cyclohexene, vinyl crotonate, divinylbenzene, N-vinyl-2-pyrrolidinone, vinylbenzyl chloride and mixtures thereof.

5. The composition of claim 4, further comprising a co-monomer selected from the group consisting of hydroxyethyl methacrylate, n-hexylmethacrylate, methacrylic acid, acrylonitrile, vinyl acetate, trimethylolpropane triacrylate, pentaerythritol triacrylate, 1,6-hexanediol diacrylate, and tripropylene glycol diacrylate.

6. The composition of claim 1, wherein the olefinic organic monomer is present in an amount ranging from about 5% by weight to about 70% by weight of the total composition.

7. The composition of claim 1, wherein the olefinic organic monomer is present in an amount ranging from about 30% by weight to about 50% by weight of the total composition.

8. The composition of claim 1, further comprising an effective amount of cure promoter.

9. The composition of claim 8 wherein the cure promoter is present in an amount of from about 0.1% by weight to about 10% by weight of the total composition.

10. The composition of claim 1, further comprising glass fibers.

11. A curable composition, comprising:
(a) from about 30% by weight to about 95% by weight of a silicone resin comprising:
   (i) at least one block consisting essentially of from about 6 to about 120 units of the formula $R_2SiO$, (ii) at least one block consisting essentially of from about 3 to about 160 units of the formula $R^1SiO_{1.5}$, and (iii) at least one block consisting essentially of from about 0.1 to about 20 mole percent of (a) and (b) of units of the formula $RR^3SiO$;

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula $$R^4C=C-\overset{O}{\overset{\|}{C}}-O-R^5-$$
   $$\ \ |\ \ |$$
   $$R^4\ R^4$$

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms,
(b) from about 5% by weight to about 70% by weight of an olefinic organic monomer selected from the group consisting of styrene, α-methylstyrene, 2-vinylpyridine, 4-vinylpyridine, 1-vinylimidazole, 2-vinylnaphthylene, 5-vinyl-2-norborene, 4-vinyl-1-cyclohexene, vinyl crotonate, divinylbenzene, N-vinyl-2-pyrrolidinone, vinylbenzyl chloride and mixtures thereof, and
(c) an effective amount of cure promoter.

12. The cured composition of claim 1.

* * * * *